United States Patent [19]

Eisen et al.

[11] Patent Number: 5,736,588
[45] Date of Patent: Apr. 7, 1998

[54] PROCESS FOR PREPARING RIGID POLYURETHANE FOAMS

[75] Inventors: Norbert Eisen, Köln; Walter Klän, Leverkusen; Frank Otto, Hilden, all of Germany; James Thompson-Colón, Edo, Mexico

[73] Assignee: Bayer Aktiengesellschaft, Leverkusen, Germany

[21] Appl. No.: 646,319

[22] PCT Filed: Nov. 9, 1994

[86] PCT No.: PCT/EP94/03688

§ 371 Date: May 15, 1996

§ 102(e) Date: May 15, 1996

[87] PCT Pub. No.: WO95/14730

PCT Pub. Date: Jun. 1, 1995

[30] Foreign Application Priority Data

Nov. 22, 1993 [DE] Germany .................. 43 39 702.6

[51] Int. Cl.⁶ ...................................... C08J 9/14
[52] U.S. Cl. ................ 521/155; 521/107; 521/108; 521/109.1; 521/128; 521/130; 521/131; 521/163; 521/168; 521/170; 521/172; 521/174
[58] Field of Search ...................... 521/155, 163, 521/168, 107, 108, 109.1, 128, 130, 131, 170, 172, 174

[56] References Cited

U.S. PATENT DOCUMENTS

| 5,223,546 | 6/1993 | Morita et al. | 521/52 |
| 5,244,931 | 9/1993 | Kuyzin | 521/114 |

FOREIGN PATENT DOCUMENTS

| 465922 | 1/1992 | European Pat. Off. . |
| 4026893 | 2/1992 | Germany . |
| 4129285 | 3/1993 | Germany . |
| 4225765 | 9/1993 | Germany . |
| 92/16573 | 10/1992 | WIPO . |

OTHER PUBLICATIONS

Database WPI, Derwent Publications Ltd. London, GB; AN 92-345080]42] and JP, A, 4 249 513 (Mitsui Toatsu Chem Inc.) Sep. 4, 1992. (Abstract).

Mario J. Molina & F.S. Rowland, Nature vol. 249 (1974) p. 810.

*Primary Examiner*—John M. Cooney, Jr.
*Attorney, Agent, or Firm*—Joseph C. Gil; Noland J. Cheung

[57] ABSTRACT

Rigid foams which possess urethane groups are prepared by reacting polyisocyanates with compounds which possess at least two active hydrogen atoms which are reactive towards isocyanate groups, in the presence of water and alkanes as blowing agent and solution promoters. The solution promoter used is a compound with a polar group.

5 Claims, No Drawings

PROCESS FOR PREPARING RIGID POLYURETHANE FOAMS

FIELD OF THE INVENTION

The invention relates to rigid foams which possess urethane groups and which are prepared without the use of chlorofluorohydrocarbons.

BACKGROUND OF THE INVENTION

Due to their outstanding thermal insulation properties, closed-cell polyurethane rigid foams have been used for many years for insulating cooling and freezing appliances, industrial plant, tank stores, piping, in ship-building and for numerous insulation applications in the building industry.

The thermal conductivity of polyurethane rigid foam which has largely closed cells is dependent to a large extent on the type of blowing agent or cell gas. Perhalogenated chlorofluorohydrocarbons (HCFCs) have proven particularly suitable for this purpose, especially trichloromethane (R11) which has a particularly low thermal conductivity. These substances are chemically inert, and thus non-toxic and non-flammable. Perhalogenated chlorofluorohydrocarbons, however, reach the stratosphere, due to their high stability, where, due to their chlorine content, they will contribute to degradation of the ozone which is present (e.g. Mario J. Molina und F. S. Rowland, Nature 249 (1974) p. 810 and first interim report from the Bundestag-Enquete-Kommission "Vorsorge zum Schutz der Erdatmosphäre" (Provisions for protecting the Earth's atmosphere) dated Feb. 11, 1988, Deutscher Bundestag, Referat Öffentlichkeitsarbeit, Bonn).

It was therefore proposed that unsubstituted hydrocarbons (alkanes) be used as blowing agents for foams, including polyurethane foams, instead of perhalogenated chlorofluorohydrocarbons.

Alkanes do not contain chlorine atoms and thus have an ODP (Ozone Depletion Potential) of zero (for comparison: R11 has an ODP of 1).

A typical representative of alkanes as blowing agents, apart from isopentane and n-pentane, is cyclopentane.

Hydrocarbons are highly non-polar, due to their chemical structure, and therefore do not mix well with the polyols and isocyanates used for producing rigid foams. However, this is an important prerequisite for conventional methods of production, in which the polyol and isocyanate components are mechanically mixed with each other.

The polyol component contains, in addition to the reactive polyether or polyester-polyols, also the blowing agent and auxiliary substances such as activators, emulsifiers and stabilisers in dissolved form. Thus, as far as the polyol component is concerned, a single-phase mixture is present.

The low solubility of hydrocarbons, when a conventional blowing agent, such as e.g. R11, is exchanged on an equimolar basis for environmentally friendly compounds (alkanes) in commercial formulations, frequently leads to the formation of two phases which can no longer be conventionally processed.

SUMMARY OF THE INVENTION

Thus the object of the invention was to increase the solubility of hydrocarbons in polyols, so that when e.g. R11 is replaced by equimolar amounts of these hydrocarbons, a single-phase polyol component is obtained.

Surprisingly, it was found that the solubility of hydrocarbons in polyols can be considerably increased when specific solution promoters, which are described in more detail below, are added.

The invention provides a method for preparing rigid foams which contain urethane groups by reacting a) polyisocyanates with b) compounds which possess at least two active hydrogen atoms which are reactive towards isocyanate groups, with a molecular weight of 92 to 10,000, in the presence of c) water and alkanes as blowing agent and d) solution promoters and optionally in the presence of e) other auxiliary substances and additives known per se, characterised in that the solution promoter d) which is used is at least one compound with a polar group, selected from the group consisting of:

d1) $R^1-O-CO-O-R^2$;

wherein $R^1$ and $R^2$ represent alkyl groups with 1 to 12 carbon atoms or together form an alkylene group with 2 to 6 carbon atoms,

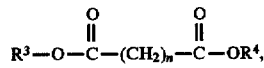

wherein $R^3$ and $R^4$ represent alkyl groups with 1 to 12 carbon atoms and n is a number from 0 to 6,

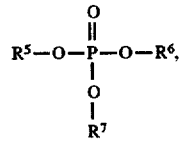

wherein $R^5$ to $R^7$ represent an optionally halogen-substituted alkyl group with 1 to 12 carbon atoms, a cycloalkyl group with 5 to 10 carbon atoms or an aryl group with 6 to 12 carbon atoms, d4) a reaction product of (i) a total of 2 moles of a fatty acid component consisting of at least one optionally unsaturated fatty acid with 15 to 25 carbon atoms and (ii) one mole of a diamine component consisting of at least one diamine of the formula

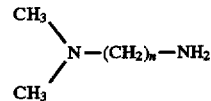

where n=2 to 10, and d5) $NR^8R^9R^{10}R^{11+}X^-$, in which $R^8-R^{11}$ represent alkyl groups with 1 to 16 carbon atoms and $X^-$ represents sulphate, carbonate, sulphonate or halide.

DETAILED DESCRIPTION OF THE INVENTION

The starting components used to produce rigid polyurethane foams are:

a) aliphatic, cycloaliphatic, araliphatic, aromatic and heterocyclic polyisocyanates such as are described by, for example, W. Siefken in Justus Liebig's Annalen der Chemie, 562, pages 75–136, for example those of the formula:

in which n is 2 to 4, preferably 2 to 3, and

Q represents an aliphatic hydrocarbon group with 2 to 18, preferably 6 to 10 carbon atoms, a cycloaliphatic hydrocarbon group with 4 to 15, preferably 5 to 10 carbon atoms, an aromatic hydrocarbon group with 6 to 15, preferably 6 to 13 carbon atoms or an araliphatic hydrocarbon group with 8 to 15, preferably 8 to 13 carbon atoms, e.g. polyisocyanates such as those described in DE-OS 2 832 253, pages 10–11.

Polyisocyanates which are readily accessible industrially are generally preferred, e.g. 2,4- and 2,6-toluylene diisocyanate and any mixture of these isomers ("TDI"), polyphenylpolymethylene polyisocyanates, such as are produced by aniline/formaldehyde condensation ("crude MDI") and polyisocyanates which possess carbodiimide, urethane, allophanate, isocyanurate, urea or biuret groups ("modified polyisocyanates"), in particular those modified polyisocyanates which are derived from 2,4- and/or 2,6-toluylene diisocyanate or from 4,4'- and/or 2,4'-diphenylmethane diisocyanate.

b) Starting components are also compounds with at least two hydrogen atoms which are capable of reacting with isocyanates and a molecular weight in general of 92 to 10,000. The molecular weight is calculated from the functionality and the OH value. Compounds which possess hydrogen atoms which are capable of reacting with isocyanates are understood to be compounds with amino, thiol or carboxyl groups, preferably compounds which possess hydroxyl groups, in particular compounds which possess 2 to 8 hydroxyl groups, preferably those with molecular weights of 200 to 1,200, particularly preferably those with molecular weights of 250 to 500, e.g. the type of polyether or polyester which possesses at least 2, generally 2 to 8, preferably 2 to 6, hydroxyl groups, such as those which are known per se for the production of homogeneous and cellular polyurethanes and those which are described in e.g. DE-OS 2 832 253, pages 11–18.

c) The blowing gases used are water and highly volatile hydrocarbons (alkanes), preferably cyclopentane and/or pentane and/or isopentane.

d) Solvent promoters which can be considered are:

d1) Dialkyl carbonates of the formula

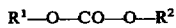

wherein $R^1$ and $R^2$ represent alkyl groups with 1 to 12 carbon atoms or an alkylene group with 2 to 6 carbon atoms. Examples which may be mentioned are: diethyl carbonate and dipropyl carbonate as open-chain compounds and ethylene carbonate, propylene carbonate as cyclic carbonates; diethyl carbonate is preferred.

d2) Esters of dicarboxylic acids in accordance with the formula $$R^3-O-\overset{O}{\underset{\|}{C}}-(CH_2)_n-\overset{O}{\underset{\|}{C}}-OR^4,$$

wherein $R^3$ and $R^4$ represent alkyl groups with 1 to 12 carbon atoms and n is a number from 0 to 6.

Examples which may be mentioned are; diethyl oxalate, dibutyl succinate, dioctyl adipate.

d3) Triesters of phosphoric acid in accordance with the formula:

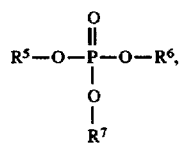

wherein $R^5$ to $R^7$ represent an optionally halogen-substituted
alkyl group with 1 to 12 carbon atoms,
cycloalkyl group with 5 to 10 carbon atoms or
aryl group with 6 to 12 carbon atoms.

Examples which may be mentioned are: triethyl phosphate, tributyl phosphate, tricresyl phosphate; tributyl phosphate is preferred.

d4) Reaction products of (i) altogether 2 moles of a fatty acid component, consisting of at least one optionally unsaturated fatty acid with 15 to 25 carbon atoms and (ii) one mole of a diamine component, consisting of at least one diamine of the formula

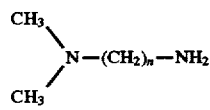

where n=2 to 10. Fatty acids which may be mentioned are: palmitic acid, stearic acid, oleic acid, linoleic acid and linolenic acid, but also mixtures of different fatty acids, such as are obtainable by ester saponification of animal and vegetable oils and fats, such as e.g. tall oil fatty acid. The reaction product from 2 moles of tall oil fatty acid and 1 mole of 3-dimethylaminopropylamine-1 is preferred.

and d5) peralkylated ammonium salts of the formula $NR^8R^9R^{10}R^{11+}X^-$, wherein $R^8$ to $R^{11}$ represent alkyl groups with 1 to 16 carbon atoms and $X^-$ represents sulphate, carbonate, sulphonate or halide. Examples which may be mentioned are: tetramethylammonium chloride, methyltrioctylammonium bromide and methyltrioctylammonium chloride. Methyltrioctylammonium chloride is preferred.

According to the invention, the solution promoters mentioned are used in amounts of 1 to 10 parts by wt., preferably 2 to 5 parts by wt., with reference to 100 parts by wt. of component b).

e) Also optionally used are further auxiliary substances and additives known per se, such as flameproofing agents, catalysts and foam stabilisers.

Flameproofing agents used are flameproofing agents known per se, preferably products which are liquid at 20° C.

Suitable foam stabilisers are mainly polyethersiloxanes, especially water-soluble representatives. These compounds are generally structured so that a copolymer of ethylene oxide and propylene oxide is bonded to a polydimethylsiloxane unit. This type of foam stabiliser is described in e.g. U.S. Pat. Nos. 2,834,748, 2,917,480 and 3,629,308. Suitable catalysts are catalysts known per se from polyurethane chemistry such as tert.-amines and/or organometallic compounds.

Reaction retardants, e.g. acidic substances such as hydrochloric acid or organic acid halides, and cell regulators of the type known per se such as paraffins or fatty alcohols or dimethylpolysiloxanes as well as pigments or dyes, and stabilisers against the effects of ageing and weathering, plasticers and fungistatic and bacteriostatic substances and fillers such as barium sulphate, kieselguhr, carbon black or prepared chalk may also be used.

Other examples of optionally used additives and foam stabilisers, as well as cell regulators, reaction retardants, stabilisers, flame inhibiting substances, dyes and fillers and fungistatic and bacteriostatic substances which can be used according to the invention and details on the use and mode of action of these additives are described in Kunststoff-Handbuch, vol. VII, edited by Vieweg and Höchtlen, Carl Hanser Verlag, Munich, 1966, e.g. on pages 121 to 205.

According to the invention, the NCO values used are in the range 100 to 300, preferably 100 to 130.

When producing the foam, expansion can also be performed according to the invention in sealed moulds. In this case, the reaction mixture is introduced into a mould. Suitable mould materials are metal, e.g. aluminium, or plastic, e.g. epoxide resin. The expandable reaction mixture expands in the mould and forms a moulded item. In this case, mould expansion can be performed in such a way that the moulded item has a cellular structure at the surface. It can also be performed, however, in such a way that the moulded item has a solid skin and a cellular core. According to the invention, in the first case the procedure used is to introduce sufficient expandable reaction mixture into the mould for the foam which is formed just to fill the mould. In the latter case, the method of working is to introduce more reaction mixture into the mould than is required to fill the interior of the mould with foam. In the latter case, therefore, the procedure makes use of "overcharging", a method of working which is known from e.g. U.S. Pat. Nos. 3,178,490 and 3,182,104.

The process according to the invention is preferably used for filling cooling and refrigerating equipment with foam.

Obviously, however, foams can also be produced by block foaming or by the double conveyer belt process known per se.

The rigid foams obtainable by the invention can be used e.g. in the building and construction industry and for insulating long-distance heating pipes and containers.

WORKING EXAMPLES

To demonstrate the mode of action of the solution promoter according to the invention, cyclopentane is added to 100 g of a polyol mixture, consisting of 95 g of a functional polyhydroxypolyether, which is a propoxylation product of sucrose, propylene glycol and water as starter with an average molecular weight of 850 g/mol and an OH value of 380, 1 g of activator (dimethylcyclohexylamine), 2 g of stabiliser B 8421® (from Goldschmidt AG), 2 g of water and 5 g of the respective solution promoter according to the invention until phase separation is noted. The amount of cyclopentane determined in this way is called the limiting concentration for solubility. The solution promoters used are:

1. diethyl carbonate
2. tributyl phosphate
3. a reaction product of two moles of tall oil acid and one mole of 3-dimethylaminopropylamine-1
4. methyltrioctylammonium chloride.

The limiting concentrations determined are given in Table 1.

TABLE 1

| | Solubility of cyclopentane [g] | | | | |
|---|---|---|---|---|---|
| | Comparison with no solution promoter | Ex. 1 with solution prom. 1 | Ex. 2 with solution prom. 2 | Ex. 3 with solution prom. 3 | Ex. 4 with solution prom. 4 |
| Limiting conc. of cyclopentane (g) in 100 g of polyol mixture | 12 | 15 | 19 | 20 | 17 |

Examples 1 to 4 according to the invention show clearly that the amounts of cyclopentane which are soluble in the polyol mixture can be raised as compared with the comparison example.

The higher the amount of cyclopentane in the polyol mixture, the higher is the proportion in the cell gas of the rigid foam produced therefrom and also the smaller is its coefficient of thermal conductivity.

We claim:

1. A process for preparing rigid foams which possess urethane groups, comprising reacting a) polyisocyanates with b) compounds which possess at least two active hydrogen atoms which are reactive towards isocyanate groups, with molecular weights of 92 to 10,000 in the presence of c) water and alkanes as blowing agent and d) solution promoters wherein said solution promoter, which is used, is at least one compound with a polar group, selected from the group consisting of diethyl carbonate, a reaction product of a total of two moles of tall oil fatty acid and a total of one mole of 3-dimethylaminopropyl-amine-1, and methyltrioctylammonium chloride.

2. The process of claim 1, wherein the solution promoters are used in amounts of 1 to 10 parts by wt. per 100 parts by wt. of component b).

3. The process of claim 1, wherein the blowing agent used is cyclopentane.

4. The process of claim 1, wherein the blowing agent used is isopentane.

5. The process of claim 1, wherein the blowing agent used is n-pentane.

* * * * *